March 30, 1926. 1,578,268
D. S. DE LAVAUD
VARIABLE SPEED TRANSMISSION
Filed Jan. 21, 1924
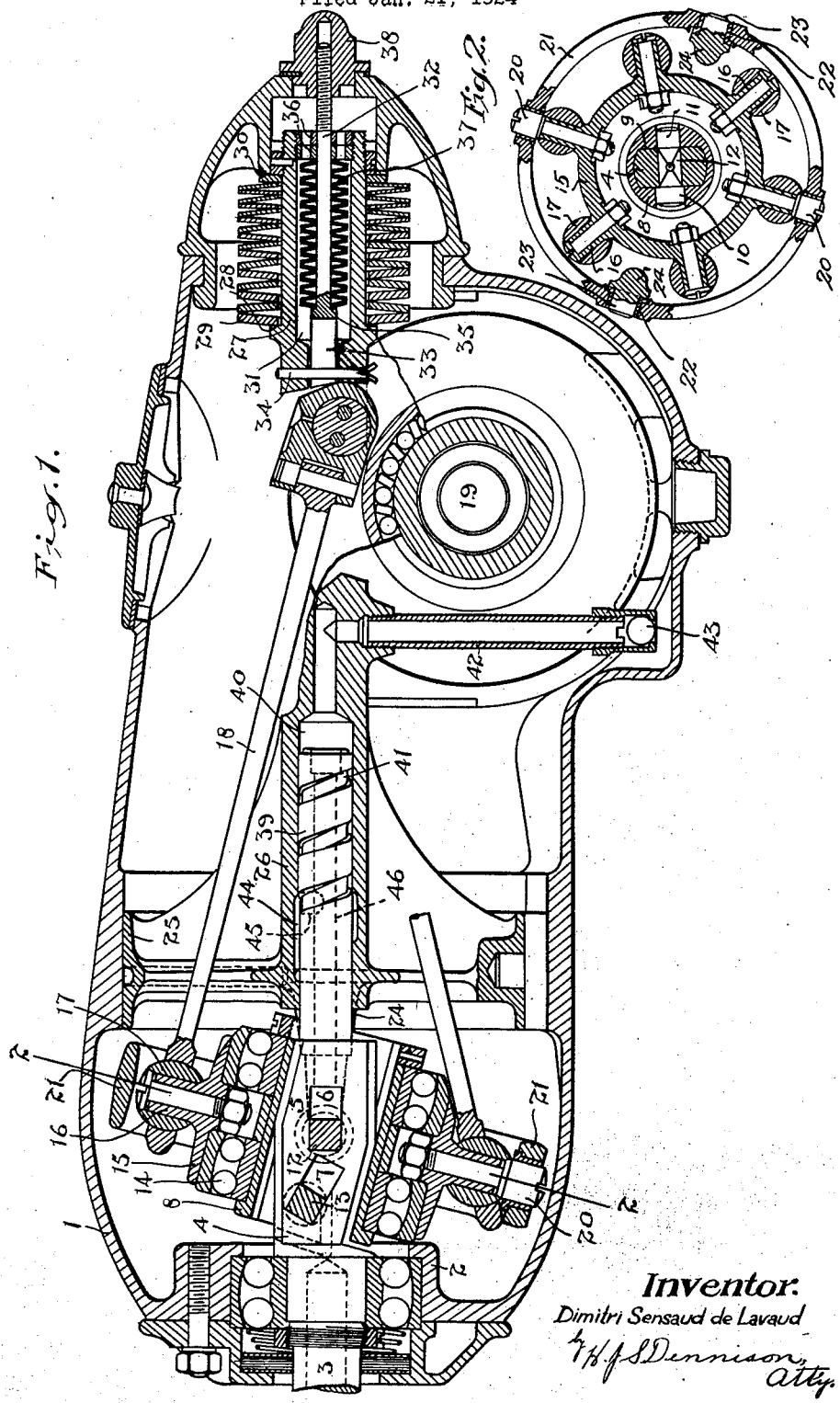
Inventor:
Dimitri Sensaud de Lavaud Patented Mar. 30, 1926.

1,578,268

UNITED STATES PATENT OFFICE.

DIMITRI SENSAUD DE LAVAUD, OF PARIS, FRANCE.

VARIABLE SPEED TRANSMISSION.

Application filed January 21, 1924. Serial No. 687,672.

*To all whom it may concern:*

Be it known that I, DIMITRI SENSAUD DE LAVAUD, a citizen of the United States of Brazil, and resident of the city of Paris, in the Republic of France, have invented certain new and useful Improvements in Variable Speed Transmission, as described in the following specification, and illustrated in the accompanying drawings, that form part of the same.

The principal objects of this invention are, to effect the transmission of power at variable speeds without disconnecting the power from the load and to accomplish the desired result with a very positively acting and simple structure of mechanism.

A still further object is to improve the balancing of the transmission of the applied power.

The principal features of the invention consist in the novel construction and arrangement of parts, whereby a balancing medium is connected with the oscillatable member of a power translating device, and whereby a cam action is effected between the rotatable member and the oscillatable member of the translating mechanism to co-operate with the balancing medium.

In the drawings, Figure 1 is a longitudinal sectional view of the improved structure.

Figure 2 is a transverse sectional view through the line 2—2 of Figure 1.

The transmission of power at variable speeds through the operation of an oscillatable member rotatably connected with the driving shaft carrying a non-rotative member to operate a plurality of reciprocable members which actuate to impart rotary motion to a transverse shaft is known and the purpose of this invention is to improve the structural conditions of such mechanisms in relieving the stresses due to the varying conditions of transmission and the varying conditions under which the driven shaft is required to operate.

In the construction herein shown the casing 1 is provided with a bearing 2 which supports the driving shaft 3.

The shaft 3 is provided with a crank extension 4 which extension is formed with the flattened parallel sides 5 and the transverse slots 6 and 7.

The slot 6 is arranged in axial alignment with the crank shaft and extends longitudinally of the extension 4 from about midway of its length toward its outer end and the slot 7 is arranged obliquely, one end thereof crossing the axial line of the drive shaft.

A sleeve 8 encircles the crank extension 4 having the flattened bearing portions 9 engaging the flat sides of the extension and in these side walls of the sleeve are arranged cylindrical bearings to receive the cylindrical ends 10 and 11 of the pin 12 which is formed with a squared central portion slidable in the slot 6.

A similar pin 13 engages the oblique slot 7 and its ends are secured in cylindrical bearings, the axis of which intersects the axis of the sleeve.

Ball bearings 14 are mounted upon the sleeve and support the ring 15 which is provided with a plurality of studs 16 upon which are rotatably mounted the ball supports 17 for the rods 18 which actuate the ratchet driving mechanisms of the transverse shaft 19.

Two of the studs 16 arranged diametrically opposite carry headed pins 20 which form pivotal supports for the ring 21 and said ring 21 is provided with bearings 22 arranged diametrically opposite and at right angles to the axis of the pins 20.

In the bearings 22 are journalled the stud ends 23 of a pair of arms 24 which form a part of a ring structure 25 which is non-rotatable in the casing 1 but is movable axially.

The ring 25 carries a central sleeve 26 coaxial with the drive shaft 3. This sleeve extends past the transverse shaft and at its rear extremity is provided with a cylindrical end 27, having the shoulder 28 at the forward end.

Encircling the cylindrical end 27 are a plurality of graduated resisting couples 29 which engage a cylindrical shoulder 30 on the casing 1. This shoulder forms a cylindrical guide for supporting the end of the sleeve 26 beyond the resisting couples.

The end of the sleeve 26 is formed with a cylindrical chamber 31 into which extends a rod 32. This rod is provided with a slotted end 33 which engages a cross pin 34 inserted through the sleeve.

The rod is formed with a shoulder 35 and between this shoulder and the rings 36 threaded in the end of the sleeve are arranged a plurality of resisting couples 37.

The rod 32 projects through the rings 36 and is adjustably secured by a nut 38 which is seated in the end of the casing 1 and is held in adjusted positions by any suitable form of lock.

The resisting couples 29 cushion the movement of the sleeve rearwardly while the resisting couples 37 cushion the movement of the sleeve forwardly. The action of the device is that when an increase in torque on the transverse shaft 19 occurs, the oscillatory movement of the ring 15 is reduced through a change in angularity. This action is facilitated by the action of the resisting couples. The increased pull on the rods 18 is transmitted to the ring 21 and from the ring 21 to the ring 25 through the connections described and as this ring carries the sleeve 26 the flexible resisting couple is brought into action.

The longitudinal movement of the sleeve and of the rotating member carrying the oscillating ring is permissible by reason of the longitudinal slot in the crank member 4 and it will be readily seen that when the sleeve 8 moves longitudinally in relation to the crank that the pin 13 operating in the oblique slot 7 acts as a cam to draw the sleeve towards a co-axial relation with the crank, consequently the increase in torque, acting through the elastic couples, directly effects the reduction of the scope of the oscillations and thereby reduces the stroke of the operating rods and the speed of the movement of the driven shaft.

The lubrication of the crank and oscillating member is a very important matter and in the present construction circulation of oil through the oscillating disc and rotating crank is accomplished by means of a spindle 39 which is connected with the end of the crank extension 4 and extends into the recess 40 in the end of the sleeve 26.

The spindle 39 is formed with a helical groove 41 which actuates as a screw pump. The rotation of this grooved spindle creates a suction which draws the oil up through the tube 42 which is provided with a check valve 43 at the bottom end and the action of the screw forces the oil through the spindle into the central portion of the oscillating disc. The passage of the oil is effected by arranging a channel 44 in the inner wall of the recess 40 of the sleeve 26 and a radial perforation 45 is made in the spindle which connects with the axial channel 46. This radial perforation conducts the oil inwardly as the spindle rotates.

What I claim as my invention is:—

1. In a variable speed transmission, the combination with the driving and driven shafts, of an oscillating member rotatable with and longitudinally movable on the driving shaft and operatively connected with the driven shaft, a flexible balancing medium opposing the pull of the torque against the oscillating member, and means arranged between the driving and oscillating member adapted upon the longitudinal movement of the oscillating member to effect a swinging movement of the oscillating member to swing it on its pivot proportionately to the resistance of the balancing medium.

2. In a variable speed transmission, a driving shaft, an oscillating member supported on said driving shaft and longitudinally movable thereon, means co-operating with the driving shaft adapted upon the longitudinal movement of the oscillating member upon the driving shaft to change the axis of oscillation thereof, and elastic means opposing the longitudinal movement of said oscillating member.

3. In a variable speed transmission, a driving shaft, an oscillating member supported on said driving shaft and longitudinally movable thereon, a slot diagonally arranged in said driving shaft, a pin mounted transversely of the oscillating member and engaging said diagonal slot and adapted upon the longitudinal movement of the oscillating member to effect a change in the relation of the axis of the oscillating member to the axis of the driving shaft, and a flexible resistance to the swinging of the oscillating member toward axial alignment with the shaft.

4. In a variable speed transmission, a driving shaft formed with a longitudinal slot in alignment with its axis, a pin slidably mounted in said slot, a sleeve pivotally mounted on said pin and rotatable with the shaft, means connected with the sleeve and engaging the shaft adapted to tilt the sleeve longitudinally on the shaft coincident with its longitudinal movement thereon, a non-rotatable ring mounted on said sleeve, a driven shaft, means connecting said ring with the driven shaft to rotate the same, a ring pivotally mounted on the latter ring, a longitudinally movable member pivotally connected to the latter ring, and a resisting couple opposing the longitudinal movement of the slidable member.

5. In a variable speed transmission, a driving shaft, an oscillating member supported on said driving shaft and longitudinally movable thereon, means co-operating with the driving shaft adapted upon the longitudinal movement of the oscillating member upon said shaft to change the axis of oscillation thereof, a longitudinally movable member connected with said oscillating member, and elastic means opposing the movement of said longitudinally movable member.

6. In a variable speed transmission, a driving shaft, an oscillating member supported on said driving shaft and longitudinally movable thereon, means co-operating with the driving shaft adapted upon the longitudinal movement of the oscillating member to change the axis of oscillation thereof, a longitudinally movable member connected with said oscillating member, a resisting couple opposing the movement of said longitudinally movable member in one direction, and a resisting couple opposing the movement of said longitudinally movable member in the opposite direction.

7. In a variable speed transmission, a driving shaft, an oscillating member supported on said driving shaft and longitudinally movable thereon, means co-operating with the driving shaft adapted upon the longitudinal movement of the oscillating member to change the axis of oscillation thereof, a ring slidable longitudinally in relation to the drive shaft and connected to the oscillating member, a casing enclosing said mechanism, a tubular member connected with the slidable ring having a cylindrical portion formed with a shoulder, a resisting couple mounted on said tubular member and abutting said shoulder at one end and abutting the casing at the other, a spindle adjustably secured to the casing and extending into said tubular member, a resisting couple supported on said spindle, and rings secured in said tubular member and abutting said couple.

8. In a variable speed transmission, the combination with the driving shaft, and an oscillating member carried upon said shaft, of a sleeve arranged in axial alignment with the shaft and connected with an oil supply and a spindle having a spiral groove therein and extending into said sleeve, said spindle being connected with the crank and having an oil channel therethrough connected with said spiral groove.

DIMITRI SENSAUD DE LAVAUD.